UNITED STATES PATENT OFFICE.

RUDOLPH LINKMEYER, OF BREMEN, GERMANY.

PROCESS OF PRODUCING DURABLE SOLUTIONS FOR SPINNING AND OTHER PURPOSES.

962,770.

Specification of Letters Patent.  Patented June 28, 1910.

Application filed June 23, 1909.  Serial No. 503,890.

No Drawing.

*To all whom it may concern:*

Be it known that I, RUDOLPH LINKMEYER, a subject of the German Emperor, and residing at Bremen, Germany, have invented a certain new and useful Improved Process of Producing Durable Solutions for Spinning and other Purposes, of which the following is a specification.

In order to produce durable ammoniacal copper oxid solutions of cellulose the applicant has proposed the incorporation of carbohydrates. It has now been found that also other organic substances such as the alcohols of higher values and similar substances can be used with advantage for the same purpose. If one incorporates such compounds as for instance mannite in the solutions, a spinning mass of very valuable properties is obtained. The same bears considerably higher temperatures than a solution consisting of pure cellulose. The substances can either be added to the completed solutions or at any stage of the process of dissolving the cellulose. The added substances are in either case dissolved and absorbed by the finished solution thus permitting the production of most excellent spinning solutions at much higher temperatures than was hitherto possible. One can use in identical manner besides the alcohols of higher values also carbohydrates such as sugar and gums.

Example: 400 grams of sulfate of copper dissolved in water are mixed with 240 ccm. of caustic soda of 38° Bé., the latter also being diluted with water. Then 20 grams of dextrin, cane sugar or mannite dissolved in water are added. This quantity of organic substances is tied up by the cupric hydrate which has been formed. In this solution one submerges 200 gr. of finely cut cotton fiber, separates by filter presses the liquid from the pulp (the latter now containing the cupric hydrate together with the organic substances added) and then dissolves this pulp in 1000 ccm. of ammonia of 910 spec. weight. Simultaneously with adding the ammonia or soon after one may add further quantities of organic substances mentioned heretofore. One may also mix the dissolving agents first, then add the specific substances and finally the cellulose, but this method is less recommendable, as the thorough incorporation of the cupric hydrate into the cellulose appears essential for its speedy and complete solution. Perfectly homogeneous solutions for the manufacture of artificial threads are thus obtained.

I now claim as my invention:

1. Process of producing solutions for spinning artificial threads that will stand a considerable amount of heat, which comprises forming a cupro-ammonium cellulose solution and adding thereto at any one of the stages of its manufacture a higher alcohol and maintaining said alcohol in the solution.

2. Process of producing solutions for forming artificial threads that will stand a considerable amount of heat, which comprises adding to a cupro-ammonium cellulose solution a higher alcohol and maintaining said alcohol in the solution.

3. Process of producing solutions for forming artificial threads that will stand a considerable amount of heat, which comprises adding to a cupro-ammonium cellulose solution a higher alcohol and a carbohydrate and maintaining said alcohol and carbo-hydrate in the solution.

In testimony whereof, I affix my signature in the presence of two witnesses.

RUDOLPH LINKMEYER.

Witnesses:
 FERDINAND REICH,
 PAUL MINCK.